United States Patent
Horna

(10) Patent No.: US 11,040,622 B2
(45) Date of Patent: Jun. 22, 2021

(54) OPERATOR CONTROL DEVICE FOR CONTROLLING FUNCTIONS OF A MOTOR VEHICLE AND METHOD FOR OPERATING SAME

(71) Applicant: Bayerische Motoren Werke Aktiengesellschaft, Munich (DE)

(72) Inventor: Guenter Horna, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/656,805

(22) Filed: Oct. 18, 2019

(65) Prior Publication Data
US 2020/0047619 A1 Feb. 13, 2020

Related U.S. Application Data

(63) Continuation of application No. PCT/EP2018/059970, filed on Apr. 19, 2018.

(30) Foreign Application Priority Data

Apr. 21, 2017 (DE) ...................... 10 2017 206 785.3

(51) Int. Cl.
*B60K 37/06* (2006.01)
*B60K 35/00* (2006.01)
(Continued)

(52) U.S. Cl.
CPC ............. *B60K 37/06* (2013.01); *B60K 35/00* (2013.01); *B60Q 9/00* (2013.01); *G06F 3/016* (2013.01);
(Continued)

(58) Field of Classification Search
CPC .. B60K 37/06; B60K 35/00; B60K 2370/158; B60K 2370/691; B60K 2370/141;
(Continued)

(56) References Cited

U.S. PATENT DOCUMENTS 5,995,026 A * 11/1999 Sellers .................. G06F 3/0202
341/22
6,348,772 B1 2/2002 May
(Continued)

FOREIGN PATENT DOCUMENTS

DE           100 05 566 A1    8/2001
DE      10 2004 014 748 A1   10/2005
(Continued)

OTHER PUBLICATIONS

International Search Report (PCT/ISA/210) issued in PCT Application No. PCT/EP2018/059970 dated Jul. 11, 2018 with English translation (seven (7) pages).
(Continued)

*Primary Examiner* — Rodney Amadiz
(74) *Attorney, Agent, or Firm* — Crowell & Moring LLP

(57) ABSTRACT

An operating device for controlling functions of a motor vehicle, includes an operator control element which can be displaced from a rest position beyond a first actuating position into a second actuating position. The operating device has a control unit which is designed to actuate, in accordance with a function which is assigned to the operator control element, a display device for displaying information associated with the function if the operating element is positioned in the first actuating position. The control unit is configured to trigger the function if the operator control element is positioned in the second actuating position. The operating device is configured to output a tactilely perceptible feedback in at least one of the positions of the operator control element.

10 Claims, 3 Drawing Sheets

(51) Int. Cl.
  *B60Q 9/00* (2006.01)
  *G06F 3/01* (2006.01)
  *G06F 3/02* (2006.01)
(52) U.S. Cl.
  CPC ...... *G06F 3/0202* (2013.01); *B60K 2370/158* (2019.05)
(58) Field of Classification Search
  CPC ......... B60Q 9/00; G06F 3/016; G06F 3/0202; B60W 50/16
  See application file for complete search history.

(56) References Cited

U.S. PATENT DOCUMENTS

| | | | |
|---|---|---|---|
| 7,060,924 B1* | 6/2006 | Beene | H01H 13/702 200/314 |
| 2006/0132469 A1 | 6/2006 | Lai et al. | |
| 2008/0202906 A1 | 8/2008 | Schelbert et al. | |
| 2008/0229871 A1 | 9/2008 | Kramlich | |
| 2010/0060437 A1 | 3/2010 | Steckel et al. | |
| 2010/0286867 A1 | 11/2010 | Bergholz et al. | |
| 2016/0175711 A1* | 6/2016 | Billington | G08B 6/00 463/38 |
| 2017/0329405 A1 | 11/2017 | Dabic et al. | |

FOREIGN PATENT DOCUMENTS

| | | |
|---|---|---|
| DE | 10 2005 040 125 A1 | 6/2006 |
| DE | 10 2005 043 587 A1 | 12/2006 |
| DE | 10 2006 060 635 A1 | 3/2008 |
| DE | 10 2007 043 935 A1 | 3/2009 |
| DE | 10 2008 046 102 A1 | 3/2010 |
| DE | 10 2011 106 784 A1 | 1/2013 |
| DE | 10 2012 020 022 A1 | 4/2014 |
| DE | 10 2012 218 843 A1 | 4/2014 |
| DE | 10 2015 016 499 B3 | 4/2017 |
| EP | 1 010 585 A2 | 6/2000 |
| FR | 3 030 071 A1 | 6/2016 |
| WO | WO 2007/009745 A2 | 1/2007 |

OTHER PUBLICATIONS

German-language Written Opinion (PCT/ISA/237) issued in PCT Application No. PCT/EP2018/059970 dated Jul. 11, 2018 (six (6) pages).

German-language Search Report issued in counterpart German Application No. 10 2017 206 785.3 dated Mar. 9, 2018 with partial English translation (12 pages).

\* cited by examiner

OPERATOR CONTROL DEVICE FOR CONTROLLING FUNCTIONS OF A MOTOR VEHICLE AND METHOD FOR OPERATING SAME

CROSS REFERENCE TO RELATED APPLICATIONS

This application is a continuation of PCT International Application No. PCT/EP2018/059970, filed Apr. 19, 2018, which claims priority under 35 U.S.C. § 119 from German Patent Application No. 10 2017 206 785.3, filed Apr. 21, 2017, the entire disclosures of which are herein expressly incorporated by reference.

BACKGROUND AND SUMMARY OF THE INVENTION

The invention relates to an operator control device for controlling functions of a motor vehicle. Moreover, the invention relates to a method for operating such an operator control device.

Similar operator control devices are used in modern motor vehicles so that the user is able to control, in particular, secondary vehicle functions in a particularly convenient way. The term "secondary vehicle functions" is understood to refer to vehicle functions which are not directly associated with the driving activity (steering, regulating the velocity, selecting a drive position, etc.). In modern motor vehicles, these operator control devices usually have a graphic user interface, for example a screen in conjunction with a control element. In addition, such operator control devices comprise at least one operator control element by means of which the user can make inputs. These operator control devices are often equipped with a function which permits the user to apply a specific secondary vehicle function to an operator control element which is preferred by the user.

However, with such operator control devices it is disadvantageous that these operator control devices are typically operated by the user in a protected environment, for example a passenger cell of a passenger car. This means it is not readily possible to transfer this technology in an easy way into the field of single-track motor vehicles, in particular motorbikes. This is because the typical user of a motorbike is protected by wearing protective clothing, in particular thick gloves. Therefore, the user of the motor vehicle may, for example, not necessarily be in a position to operate to the full extent the operator control elements of an operator control device as described at the beginning which are usually embodied in a very delicate fashion. For example, it may not be possible for the user of the motorbike to differentiate between simple contact and activation of an operator control element which has already begun.

The object of the invention is to provide an operator control device for controlling functions of a motor vehicle, in particular a motorbike, which can be operated to their full extent through protective clothing.

According to the invention, an operator control device for controlling functions of a motor vehicle includes an operator control element which can be moved out of a position of rest, beyond a first activation position into a second activation position, and a control unit which is configured to actuate, in accordance with a function to which the operator control element is assigned, a display device to display information associated with the function if the operator control element is arranged in the first activation position, and to trigger the function if the operator control element is arranged in the second activation position. The operator control device is configured to output feedback, which can be perceived in a tactile fashion, in at least one of the positions of the operator control element.

In other words, the operator control device comprises a control unit which is connected, on the one hand, to the operator control element and, on the other hand, to the display device. If the operator control element is activated into the first activation position, that is to say is deflected from the position of rest into the first activation position, for example by a user, in particular a driver of the motor vehicle, preferably of a motorbike, the information which is associated with the function can be output via the display device by means of the control unit. The information which is associated with the function can, for example, provide a user with informative data as to which function the operator control element is currently assigned to. If the operator control element is deflected beyond the first activation position into the second activation position, the function to which the operator control element is currently assigned can be triggered. This function can be, in particular, secondary vehicle functions which are not directly associated with the driving activity.

According to the invention, there is also provision that feedback is provided to the user via the operator control device, so that the user can determine without doubt which activation position the operator control element is currently arranged in. According to the invention, this feedback can be perceived in a tactile fashion, so that the user of the motor vehicle can also unambiguously interpret the feedback even through protective gloves. For example, this feedback can be capable of being output when the operator control element is arranged in the first activation position. Alternatively or additionally, the feedback can be capable of being output via the operator control device when the operator control element is arranged in the second activation position.

However, the operator control device described herein can also be advantageously used in a motor vehicle which is embodied as a passenger car or utility vehicle, since with these motor vehicles conditions can also occur in which a conventional operator control device can be operated to its full extent only under difficult circumstances. For example, shocks can be transmitted to the user of the motor vehicle, in particular, in the case of particularly unsteady travel, for example in the case of travel off-road or in the case of a particularly poor state of a roadway, via the motor vehicle to the user. It is also to be noted that during travel users of motor vehicles may be forced to wear gloves and/or further protective clothing, for example for reasons of work and safety laws or also owing to illness.

In a further embodiment of the invention, in the first activation position an activation portion of the operator control element bears against a stop step, as a result of which feedback which can be perceived in a tactile fashion can be generated. This is advantageous since there is an, in particular, spatial relationship between activation of the operator control element and the tactile feedback. It is therefore unambiguously clear to a user of the motor vehicle that the feedback which the user has received is directly related to the operator control element. As a result, the user is distracted to a particularly small degree, which results in increased safety.

Alternatively or additionally, in the second activation position the activation portion of the operator control element bears against an end stop, as a result of which feedback perceptible in a tactile fashion can be generated. It is therefore also clear to the user of the motor vehicle if the user has moved the activation element into the activation position.

The control unit can be configured to actuate an actuator, which acts on the operator control element, to output feedback which can be perceived in a tactile fashion. This is advantageous since there is a spatial relationship between the operator control element and the feedback which can be perceived in a tactile fashion, as a result of which for the driver of the motor vehicle there is an intuitive relationship between activation of the operator control element and the feedback. In other words, it can be self-explanatory to the driver that the feedback which can be perceived in a tactile fashion comes about as a result of the driver having activated the operator control element.

It has also proven advantageous if the control unit is configured to actuate an actuator, which acts on a component which is different from the operator control device, to output feedback which can be perceived in a tactile fashion. This means that the feedback which can be perceived in a tactile fashion does not necessarily have to have a spatial relationship with the operator control element. It is therefore possible, for example, for an existing actuator to be used which can be configured to cause information or (warning) signals of a driver assistance system to be communicated to the user of the motor vehicle, for example by means of a vibration. For example, the feedback can be provided at a pedal arrangement, on a seat surface, at a steering element or at some other location where the user is in direct physical contact with the motor vehicle.

When, in particular, actively actuated actuators are used it is advantageous that a perceptible signal of the respective actuators which are possibly already present, for example a vibration signal, is already configured to be unambiguously perceptible by means of a glove or further parts of protective clothing. It is also advantageous here that the operator control device can be integrated into the motor vehicle at particularly low cost.

In a further advantageous refinement of the invention, the control unit is configured to actuate the actuator or the actuators to output feedback, which can be perceived in a tactile fashion, in at least one of the positions of the operator control element. In other words, the respective actuator can be capable of being actuated by way of the control unit if the operator control element is arranged in the first activation position. Alternatively or additionally, the actuator can be capable of being actuated via the control unit if the operator control element is arranged in the second activation position.

In particular, the control unit can be configured to output respectively different signals, so that first feedback which can be perceived in a tactile fashion can be output by way of the respective actuator if the operator control element is arranged in the first activation position, and second feedback which can be perceived in a tactile fashion can be output if the operator control element is arranged in the second activation position. In this context, the first and second feedback items which can be perceived in a tactile fashion can be different from one another. This is advantageous, in particular, since it is unambiguously clear to the user whether the user has activated the operator control element into the first activation position or into the second activation position.

According to one advantageous embodiment, the operator control device is protected at least in certain areas against a penetration of moisture. This is appropriate, in particular, with respect to a purpose of use of the operator control device in a motor vehicle which is embodied as a motorbike. This is because a passenger cell which is even only partially enclosed is not present in a motorbike, as a result of which, on the one hand, the user of the motorbike and, on the other hand, the operator control device with its operator control elements are not protected against the influences of the weather and the environment.

The present invention also provides a method for operating an operator control device as described herein in which, in accordance with the function to which the operator control element is assigned, the display device is actuated, by way of the control unit, to display the information which is associated with the function if the operator control element is arranged in the first activation position. It is also part of the method that in accordance with the function to which the operator control element is assigned, the function is triggered by the control unit if the operator control element is arranged in the second activation position. Moreover, in the method, feedback which can be perceived in a tactile fashion is output in at least one of the positions of the operator control element by means of the operator control device.

In other words, the method comprises a first step in which, as soon as the operator control element is arranged in the first activation position, the display device is actuated by the control unit in such a way that the information which provides informative data and/or more details on the function which is currently allocated to the operator control element is displayed on the display device. In a second step, that is to say when the operator control element is arranged in the second activation position, the function which is currently allocated to the operator control element is triggered by the control unit. In this method, it is also provided that feedback which can be perceived in a tactile fashion, that is to say, for example, vibration, is output, specifically when the operator control element is arranged in one of the activation positions. In particular it is contemplated that in each case feedback which can be perceived in a tactile fashion is output by way of the operator control device when the operator control element is arranged in the first position and in the second position.

In one advantageous development of the method for operating the operator control device, another function can be allocated to the operator control element by way of the control unit if the operator control element is held for a predefined minimum period in the second activation position, and during this time an element which represents the other function is marked visually by means of the display device. For example, a user of the motor vehicle can allocate a function to the corresponding operator control element by firstly causing the corresponding entry, that is to say the element which represents the function, to be displayed on the display device, and concentrating on said element. For example, the element which represents the function can be placed in a box, can have a particularly contrasting background, can place a (mouse) cursor thereon or make it point thereto etc. Subsequently, the user can deflect the operator control element into the second activation position and hold it there, for example press it and then keep it pressed, as a result of which precisely that function whose corresponding entry is currently selected on the display device, i.e. is concentrated on with at least one of the measures described above, is allocated to the activated operator control element. This is advantageous insofar as a user is able to link his preferred vehicle functions, which can be displayed by the display device, to an operator control element which can be reached particularly quickly. The particularly preferred vehicle functions can be vehicle functions which the user or driver triggers particularly frequently. As a result, in particular when the desired function is called up, the period of time which is required for this is reduced, so that the driver is distracted only to a particularly small degree from primary driving activities and/or events on the road.

In addition, it has proven advantageous if in the method an actuator for outputting feedback which can be perceived in a tactile fashion is actuated by the control unit as soon as the allocation of the other function to the operator control element has taken place. In other words, the control unit actuates the actuator so that it outputs the feedback which can be perceived in a tactile fashion as a confirmation as soon as the other function has been associated with the operator control element. This is particularly advantageous since it is unambiguously confirmed to the user of the motor vehicle that a new function has been allocated to the operator control element, as a result of which it is clear to the user that he can release the corresponding operator control element again.

Advantageous refinements of the operator control device according to the invention for controlling functions of a motor vehicle are to be considered advantageous embodiments of the method according to the invention for operating said operator control device, wherein the operator control device is used to carry out the method steps.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
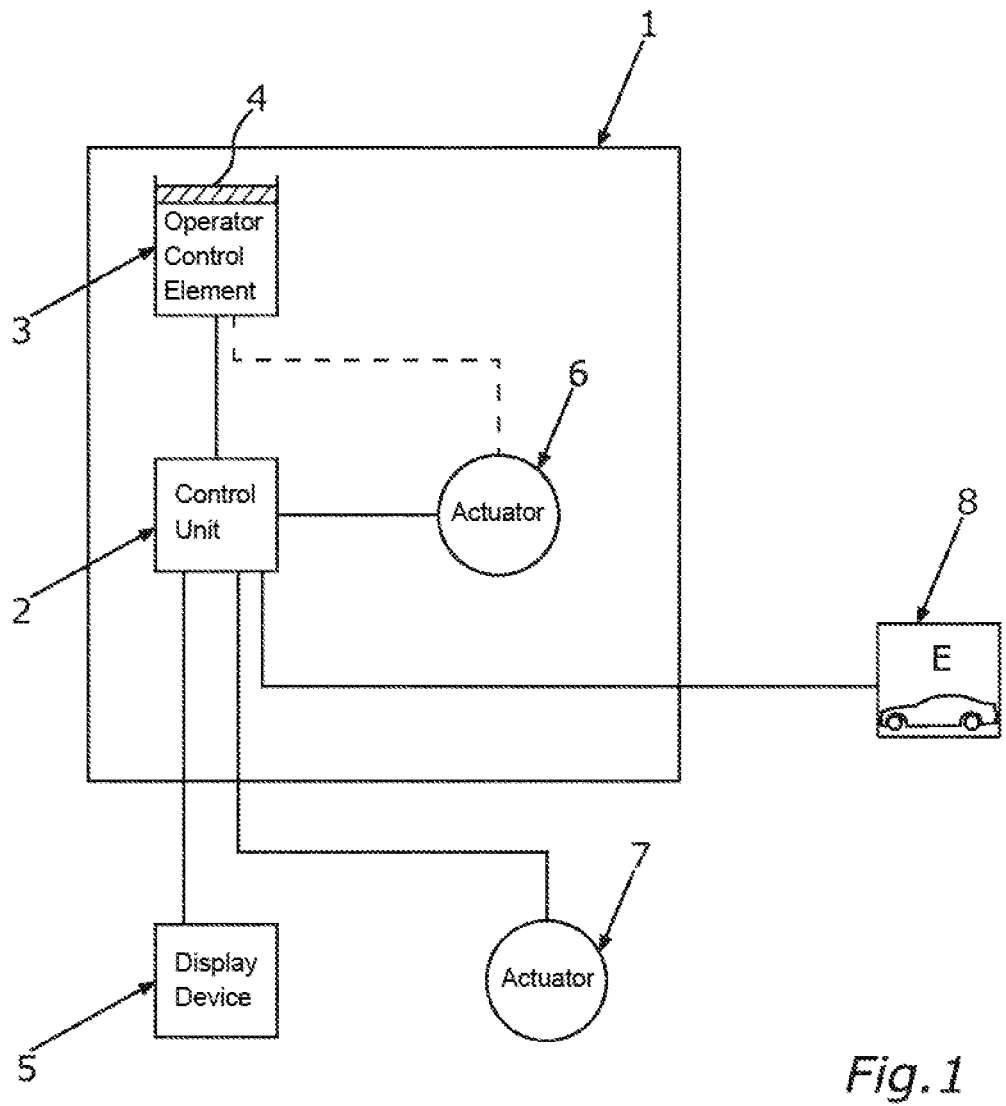
FIG. 1 is a schematic block circuit diagram of an operator control device for controlling functions of a motor vehicle.

FIG. 1 shows a schematic block circuit diagram of an operator control device 1 for controlling functions of a motor vehicle which is embodied as a motorbike. A motorbike is a single-track motor vehicle astride which a user sits, similarly to a bicycle. Since a motorbike, which can also be referred to as a motorcycle, does not have a passenger cell, the user and operator control elements of the motorbike are not insulated from the environment. Moreover, when riding the motorbike, the user is, of course, exposed to influences of the weather, in addition to the airstream, for which reason the user of the motorcycle is usually protected by use of special protective clothing, which can include a pair of gloves. Furthermore, the direct physical contact between the rider of the motorbike and the motorbike leads to a situation in which vibrations of the motorbike are transmitted directly to the rider. Correspondingly, particular requirements are made of operator control devices of motorbikes, which will be described in more detail below.

Correspondingly, FIG. 1 illustrates the operator control device 1 which has a control unit 2 and an operator control element 3 which is connected thereto. The operator control element 3 can assume three positions. Therefore, as illustrated in FIG. 1, the operator control element 3 is arranged in the position of rest. This means that an activation portion 4 of the operator control element 3 is not activated and is in the home position. If the operator control portion 4 is activated, that is to say for example pressed by the driver, the operator control element 3 can be moved into a first activation position. If an activation operation ends at this point, the operator control element is configured to return automatically to the activation position. For example the operator control element can have a spring element which can be tensioned by moving the operator control portion 4 within the operator control element 3, but this is not explained in more detail. Accordingly, the operator control portion 4 can be moved, in particular, automatically into the position of rest by relaxing the spring element.

The operator control element 3 is connected in a wireless and/or wire-bound fashion to the control unit 2. In addition, the operator control device 1 is connected to a display device 5, wherein this connection can also be implemented in a wireless and/or wire-bound fashion. In particular, the display device 5 can be connected to the control unit 2 of the operator control device 1. Moreover, the operator control device 1 can have at least one actuator 6 which can be connected to the control unit 2. Alternatively or additionally, the operator control device 1 can be connected to at least one external actuator 7, for example the external actuator 7 can be connected to the control unit 2.

Furthermore, the operator control device 1 is connected to the motorbike. This means that the operator control device 1 is connected at least to part of the vehicle electronics 8 of the motorbike, that is to say to part of the motorbike, as a result of which the operator control device 1 is able to control, in particular, secondary vehicle functions of the motorbike via the control unit 2. In particular, the operator control device 1 is configured to control a secondary vehicle function, in particular to trigger it, via the control unit 2 in accordance with an activation position of the operator control element 3.

As already described, the display device 5 is connected to the operator control device 1 in such a way that information can be output on the display device 5 by way of the control unit 2. If the operator control element 3 is deflected from the position of rest and moved into the first activation position, it is possible, in accordance therewith, to output information which is associated with a vehicle function on the display device 5. In particular, this information can be associated with the vehicle function which is currently allocated to the operator control element 3. For example, the calling up of the on-board computer can be allocated to the operator control element 3. This means that if the user of the motorbike arranges the operator control element 3 in the first activation position, for example the information that the operator control element 3 is linked to the function of the on-board computer is output on the display device 5 via the control unit 2. If the operator control element 3 is arranged beyond the first activation position into the second activation position, the function which is currently allocated to the operator control element 3 is triggered. In order to pick up the above example again, the on-board computer can be called up, for example, when the operator control element 3 is activated into the second activation position.

The operator control device 1 is also configured to output feedback, which can be perceived in a tactile fashion, to the user of the motorbike, for example, via the operator control element 3 itself and/or via one or more actuators 6 or via one or more actuators 7, if the operator control element 3 is arranged in the first activation position and/or in the second activation position. This means that under adverse conditions the user of the motorbike, in particular the rider, can himself sense whether he has arranged the operator control element 3 in the first activation position and/or in the second activation position. In particular, as a result, the rider of the motorbike is able to sense through the protective clothing the activation position in which the operator control element 3 is currently arranged. Therefore, when the rider of the motorbike activates the operator control element 3 it is already clear to him whether information is output on the display device 5 or whether the function which is associated with the operator control element 3 is triggered. In other words, the rider of the motorbike can decide in a precisely targeted fashion whether he wishes to obtain only information relating to the corresponding function or whether he would ultimately like to trigger this function.

Figure 2A:
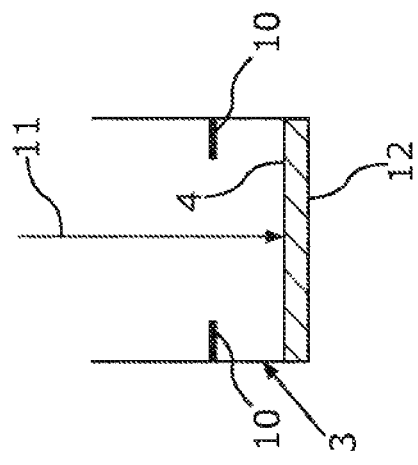
FIGS. 2A and 2B show an operator control element of the operator control device which is arranged in the first activation position (FIG. 2A) and in the second activation position (FIG. 2B).
Figure 2B:
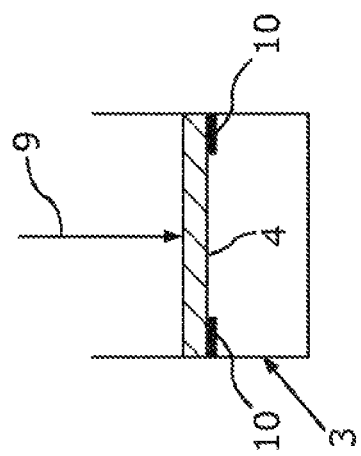

FIGS. 2A and 2B each show a schematic illustration of a principle of the operator control element 3 of the operator control device 1, which operator control element 3 is arranged in the first activation position (FIG. 2A) and in the second activation position (FIG. 2B). Starting from the position of rest of the operator control element 3 as shown in FIG. 1, the operator control portion 4 of the operator control element 3 can be deflected by a first activation force 9, for example counter to a spring element (not illustrated in more detail). In order then to generate feedback which can be perceived in a tactile fashion, the operator control element 3 can have a stop step 10 which can be overcome in a reversible fashion. For example, the stop step 10 can be embodied by at least one spring-elastic element against which the operator control portion 4 of the operator control element 3 impacts as soon as the latter has been moved into the first activation position. This impacting of the operator control portion 4 on the stop step forms the feedback which can be perceived in a tactile fashion by the user of the motorbike, which feedback indicates to said user that the operator control element 3 is arranged in the first activation position.

If, starting from the first activation position as shown in FIG. 2A, a second activation force 11 is applied to the activation portion 4 of the operator control element 3, said activation portion 4 can be moved into the second activation position by virtue of the fact that the stop step 10, i.e. the elastic spring element, can, for example, be overridden. If the stop step 10 is overridden, when there is maximum deflection the operator control portion 4 bears on an end stop 12 which can be formed, for example, by a base of the operator control element 3. It is clear to the rider of the motorbike at the latest when the operator control portion 4 strikes against the end stop 12, that is to say against the base of the operator control element 3, that the operator control element is arranged in the second activation position. In addition, the feedback which can be perceived in a perceptible fashion by the user of the motorbike can also be brought about by virtue of the fact that in comparison a larger force is necessary to override the stop step 10 than to activate the operator control element into the first activation position.

Referring again to FIG. 1, it is illustrated there that the feedback which can be perceived in a tactile fashion can also be generated by way of the actuator 6. The actuator 6 can be in mechanical contact with the operator control element 3, which is illustrated in FIG. 1 by a dashed line. This means that the control unit 2 can be configured to investigate an activation of the operator control element 3 to determine whether it is arranged in the first activation position or in the second activation position. Depending on the result, the control unit 2 can actuate the actuator 6 so that it conducts feedback, which can be perceived in a tactile fashion, for example vibration, to the user of the motorbike via the operator control element 3. In particular, the control unit 2 can be configured to actuate the actuator 6 in such a way that first feedback which can be perceived in a tactile fashion is output if the operator control element 3 is arranged in the first activation position, and that second feedback which can be perceived in a tactile fashion is output to the operator control element 3 via the actuator 6 if the operator control element 3 is arranged in the second activation position. In this context, the first feedback which can be perceived in a tactile fashion and the second feedback which can be perceived in a tactile fashion are different from one another.

In addition, it is illustrated in FIG. 1 that the operator control device 1 and, in particular, the control unit 2 can be configured to be able to output the feedback, which is described above, and can be perceived in a tactile fashion, alternatively or additionally via the actuator 7. In this context, the actuator 7 can be in mechanical contact with a component of the motorbike which is different from the operator control device. For example, the actuator 7 can be in mechanical contact with a steering element of the motorbike, with a pedal arrangement of the motorbike or with a seat surface of the motorbike, etc. Accordingly, the feedback which can be perceived in a tactile fashion can correspondingly be sensed by the driver of the motorcycle, for example at the steering element, at the pedal arrangement and/or on the seat surface, as soon as the operator control element 3 is arranged in the first activation position or in the second activation position.

Figure 3:
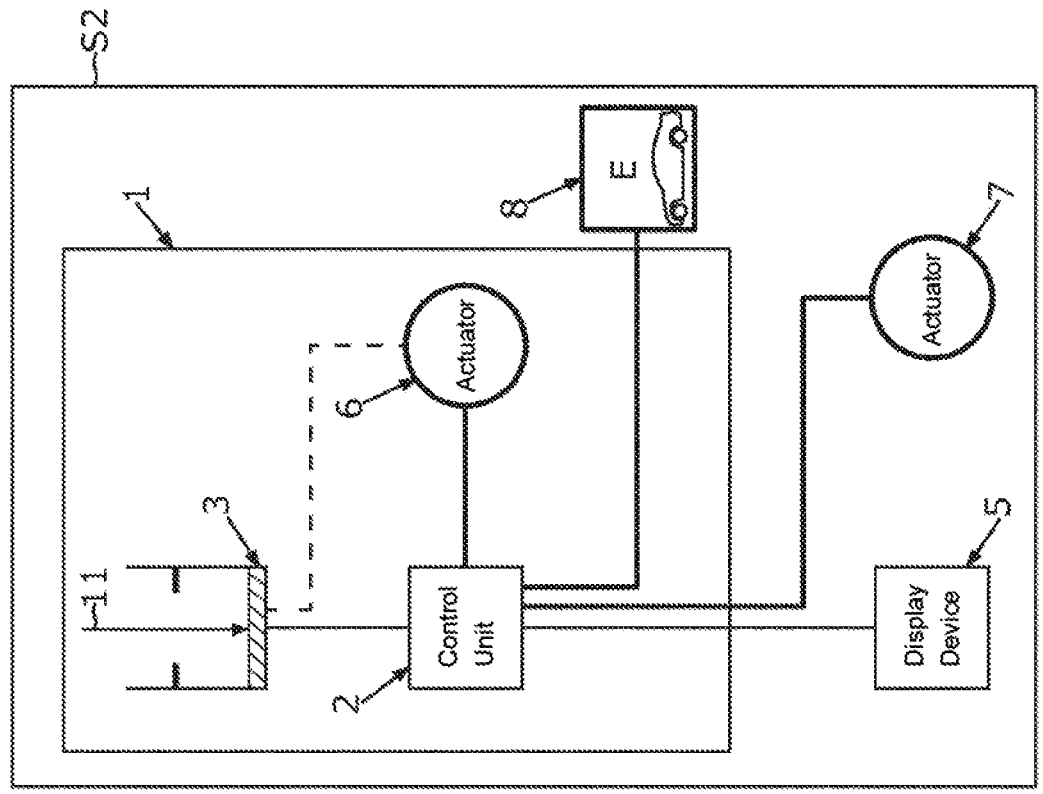
FIG. 3 illustrates steps of a method for operating the operator control device.
Figure 3:
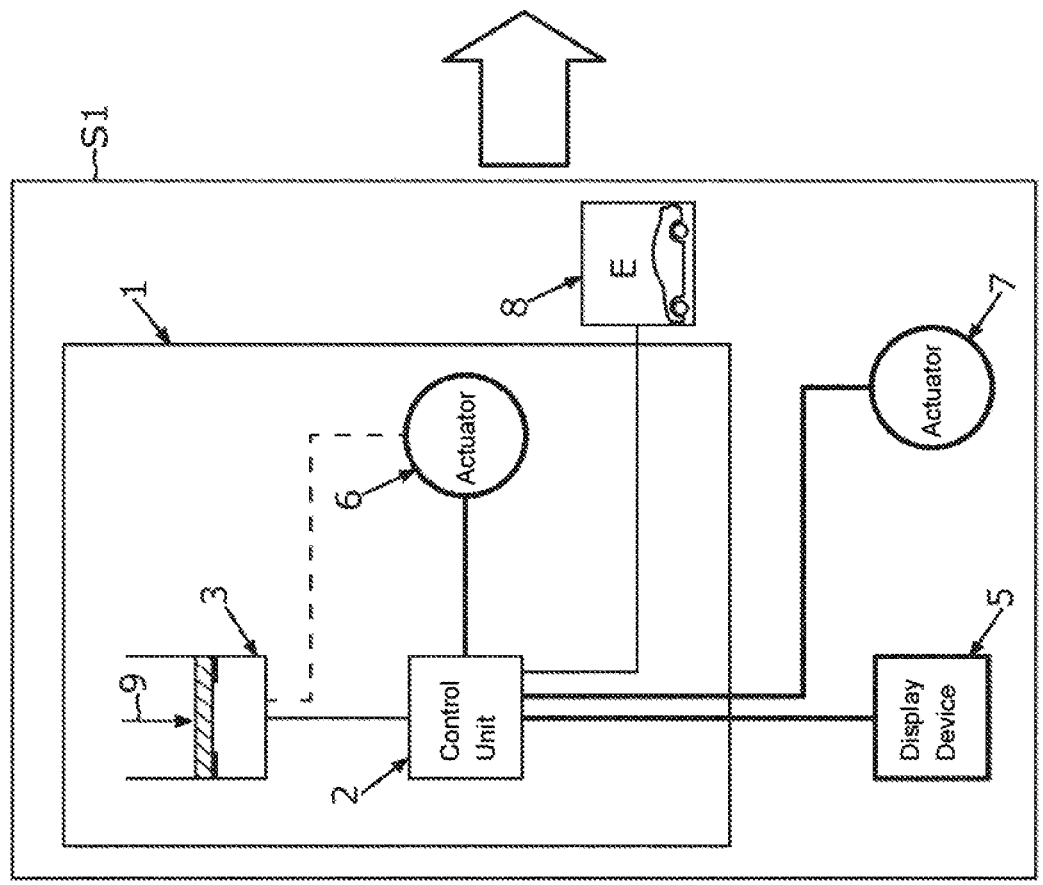

FIG. 3 shows steps of a method for operating the operator control device which is described above. In a first step S1, the operator control element 3 is deflected into the first activation position. As a result, the control unit 2 causes the display device 5 to output the information which is associated with the function. In a second step S2, the operator control element 3 is deflected into the second activation position, for example by way of the second activation force 11, so that the vehicle function which is linked to the operator control element 3 is triggered by the control unit 2. In this context, the first activation force can be lower than the second activation force.

At the same time as the first step S1 and/or at the same time as the second step S2, feedback which can be perceived in a tactile fashion is output by the control unit 2 in that the control unit 2 actuates the actuator 6 and/or the actuator 7. The actuator 6 is mechanically connected to the operator control element 3 so that the feedback which can be perceived in a tactile fashion is output via the operator control element 3. The actuator 7 is mechanically connected to a part of the motorbike which is different from the operator control device, so that the feedback which can be perceived in a tactile fashion is output at this location. For example, the feedback which can be perceived in a tactile fashion can be output at a steering element, at a pedal arrangement and/or on a seat surface, etc., of the motorbike.

If it is detected, for example, by the control unit 2 that the operator control element 3 is held for a predefined minimum time in the second activation position, the control unit 2 allocates a different function to the operator control element. In particular, the control unit 2 allocates to the operator control element 3 the function which is currently marked visually by means of the display device but is not triggered. In other words, the rider of the motorbike navigates, by means of a control element (not described in more detail) and using the display device 5, to the corresponding entry which triggers the function which the user of the motorbike would like to apply to the operator control element 3 according to their desires. If the operator control element 3 is then activated beyond the first activation position into the second activation position and held there for the predefined minimum period, the control unit 2 links the entry which is currently marked on the display device, that is to say for example triggering of a function, to the operator control element 3. Again, in other words, the operator control element 3 can be programmed by a user of the motorbike, in particular the rider. That is to say the user therefore allocates to the operator control element 3 a function which is desired by him, so that simple activation of this operator control element 3 triggers the allocated function, or a corresponding function is output on the display device 5.

If the allocation of another function as described above to the operator control element 3 has been concluded, the actuator 6 and/or the actuator 7 can be actuated by way of the control unit, so that feedback which can be perceived in a tactile fashion is generated in order to signal to the user of the motorbike that the allocation of the other function to the operator control element 3 was successful. In particular, the feedback which can be perceived in a tactile fashion can be, as confirmation of the association of the other function with the operator control element, further feedback which can be perceived in a tactile fashion and is different from the previously described feedback which can be perceived in a tactile fashion.

The preceding description also applies to an operator control device which is used in a multi-track motor vehicle, that is to say for example in a passenger car, a utility vehicle, etc.

LIST OF REFERENCE SYMBOLS

1 Operator control device
2 Control unit
3 Operator control element
4 Activation portion
5 Display device
6 Actuator included in the operator control device 1
7 Actuator which is external to the operator control device 1
8 Vehicle electronics
9 Stop step
10 Spring-elastic element
11 Second activation force
12 End stop
S1 First method step
S2 Second method step The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operator control device for controlling functions of a motor vehicle, comprising:
   an operator control element which is movable out of a position of rest, beyond a first activation position and into a second activation position; and
   a control unit which is configured:
      to actuate, in accordance with a function of the motor vehicle to which the operator control element is assigned, a display device to display information associated with the function, when the operator control element is arranged in the first activation position, and
      to trigger the function when the operator control element is arranged in the second activation position,
   wherein the operator control device is configured to output feedback, which is perceptible in a tactile fashion, in at least one of the first and second activation positions of the operator control element, at least partially in response to control by the control unit, and
   wherein, in the first activation position, an activation portion of the operator control element comes to rest against a stop step configured to be reversibly overcome, such that, as a result of the activation portion coming to rest against the stop step, the feedback perceptible in a tactile fashion is generated.

2. The operator control device according to claim 1, wherein in the second activation position, an activation portion of the operator control element comes to rest against an end stop, as a result of which the feedback perceptible in a tactile fashion is generated.

3. The operator control device according to claim 1, wherein the control unit is configured to actuate a first actuator, which acts on the operator control element, to output the feedback perceptible in a tactile fashion.

4. The operator control device according to claim 3, wherein the control unit is configured to actuate a second actuator, which acts on a component which is different from the operator control device, to output the feedback perceptible in a tactile fashion.

5. The operator control device according to claim 4, wherein the control unit is configured to actuate the actuators to output the feedback in at least one of the positions of the operator control element.

6. The operator control device according to claim 3, wherein the control unit is configured to actuate the actuators to output the feedback in at least one of the positions of the operator control element.

7. The operator control device according to claim 1, wherein the operator control device is protected at least in certain areas against a penetration of moisture.

8. A method of operating an operator control device that controls functions of a motor vehicle, the operator control device having an operator control element movable out of a rest position, beyond a first activation position, and into a second activation position, and having a control unit configured to actuate a display device in accordance with a function of the motor vehicle to which the operator control element is assigned, the method comprising the acts of:
   in accordance with the function to which the operator control element is assigned, actuating the display device via the control unit to display information associated with the function when the operator control element is arranged in the first activation position;
   in accordance with the function to which the operator control element is assigned, triggering the function via the control unit when the operator control element is arranged in the second activation position; and
   outputting, via the operator control device, feedback perceptible in a tactile fashion in at least one of the first and second activation positions of the operator control element,
   wherein, in the first activation position, an activation portion of the operator control element comes to rest against a stop step configured to be reversibly overcome, such that, as a result of the activation portion coming to rest against the stop step, the feedback perceptible in a tactile fashion is generated.

9. The method of operating the operator control device according to claim 8, wherein another function is allocated to the operator control element by the control unit if the operator control element is held for a predefined minimum time period in the second activation position, and during said time period an element which represents the other function is marked visually by way of the display device.

10. The method for operating an operator control device according to claim 9, wherein an actuator for outputting the feedback perceptible in a tactile fashion is actuated by the control unit as soon as the allocation of the other function to the operator control element occurs.

\* \* \* \* \*